United States Patent
Aardema et al.

(10) Patent No.: US 9,464,580 B2
(45) Date of Patent: Oct. 11, 2016

(54) TORQUE LIMIT CONTROL

(71) Applicant: Caterpillar Paving Products, Inc., Minneapolis, MN (US)

(72) Inventors: James A. Aardema, North Plymouth, MN (US); Eric Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 337 days.

(21) Appl. No.: 14/146,504

(22) Filed: Jan. 2, 2014

(65) Prior Publication Data
US 2015/0184680 A1    Jul. 2, 2015

(51) Int. Cl.
| | |
|---|---|
| *E02F 9/22* | (2006.01) |
| *F02D 29/04* | (2006.01) |
| *F15B 18/00* | (2006.01) |
| *F16H 61/12* | (2010.01) |
| *F16H 61/4017* | (2010.01) |
| *F16H 61/4148* | (2010.01) |
| *F02B 3/06* | (2006.01) |

(52) U.S. Cl.
CPC .............. *F02D 29/04* (2013.01); *F15B 18/00* (2013.01); *F16H 61/12* (2013.01); *F16H 61/4017* (2013.01); *F16H 61/4148* (2013.01); *E02F 9/2242* (2013.01); *F02B 3/06* (2013.01); *F15B 2211/20523* (2013.01); *F15B 2211/20576* (2013.01); *F15B 2211/50518* (2013.01); *F15B 2211/5157* (2013.01); *F15B 2211/528* (2013.01)

(58) Field of Classification Search
CPC .................. E02F 9/2242; F15B 2211/20576; F15B 2211/50518
See application file for complete search history.

(56) References Cited

U.S. PATENT DOCUMENTS

| | | | |
|---|---|---|---|
| 3,716,308 A * | 2/1973 | Kobald | 417/286 |
| 4,044,786 A | 8/1977 | Yip | |
| 4,180,981 A | 1/1980 | Pensa | |
| 5,069,037 A | 12/1991 | Sakigawa et al. | |
| 5,549,185 A | 8/1996 | Kale | |
| 5,611,751 A | 3/1997 | Ehrenhardt et al. | |
| 5,615,553 A | 4/1997 | Lourigan | |
| 6,293,765 B1 * | 9/2001 | Peterson | 417/288 |
| 7,727,114 B2 | 6/2010 | Tarasinski et al. | |
| 7,762,371 B2 | 7/2010 | Kawamura et al. | |

(Continued)

FOREIGN PATENT DOCUMENTS

| | | |
|---|---|---|
| DE | 196626793 | 7/1996 |
| EP | 2184495 | 12/2010 |

(Continued)

*Primary Examiner* — F. Daniel Lopez
(74) *Attorney, Agent, or Firm* — Miller, Matthias & Hull LLP

(57) ABSTRACT

A prime mover transfers power to a separate hydraulic circuits via a power take off (PTO). In some situations, a peak torque demand in one of the hydraulic circuits may cause the total torque of all hydraulic circuits to exceed a rated torque at the PTO. An apparatus measures hydraulic fluid pressure in a first hydraulic circuit and adjusts the hydraulic fluid pressure in a second hydraulic circuit. Because pressure is directly correlated to torque at a pump, by adjusting the pressure in the second circuit based on the current pressure in the first hydraulic circuit, the total torque may be capped below the maximum torque rating at the PTO. The first hydraulic circuit may have a higher priority function, such as steering, compared to that of the second hydraulic circuit which may, for example, power a tool.

6 Claims, 5 Drawing Sheets

(56) References Cited

U.S. PATENT DOCUMENTS

| | | |
|---|---|---|
| 8,024,926 B2 | 9/2011 | Cheong |
| 8,140,206 B2 | 3/2012 | Bailey et al. |
| 8,230,954 B2 | 7/2012 | Majkrzak |
| 2007/0079533 A1 | 4/2007 | Kuerten |
| 2007/0095059 A1* | 5/2007 | VerKuilen et al. ............ 60/468 |
| 2010/0287924 A1 | 11/2010 | Dostal et al. |

FOREIGN PATENT DOCUMENTS

| | | |
|---|---|---|
| GB | 1131314 A | 10/1966 |
| GB | 1303671 A | 1/1973 |
| KR | 1161307 B1 | 5/2012 |
| SU | 1544600 A1 | 2/1990 |
| WO | 2006011836 | 2/2006 |
| WO | 2009102740 | 8/2009 |

* cited by examiner

US 9,464,580 B2

TORQUE LIMIT CONTROL

TECHNICAL FIELD

The present disclosure relates to hydraulic implements and more particularly to limiting torque presented by a hydraulic implement.

BACKGROUND

A power takeoff (PTO) unit may be used to transfer power between a prime mover, such as a diesel engine, and one or more hydraulic pumps. In applications where two or more hydraulic pump are in use, the total torque of the combined hydraulic pumps may, especially during transient conditions, exceed the torque rating of the PTO and/or the prime mover. Catastrophic failure of the prime mover may result.

An example is a road compactor that uses one hydraulic pump to drive a steering circuit and another hydraulic pump to drive a compactor unit. The startup of the compactor unit can cause very high transient pressures in the hydraulic circuit of the compactor hydraulic pump. If this occurs when a steering maneuver is in process, such as turning over a bump, the resulting total pressure demands in the respective hydraulic circuits can, in turn, create very high torques at the hydraulic pumps. The combined torque reflected back through the PTO to the prime mover can cause mechanical failures in critical components of a gear train of the PTO or the prime mover.

U.S. Published Patent Application 20070079533 (the '533 application) discloses a hydraulic system that uses a sensor on a hydraulic circuit with a compactor in a machine used for snow surface preparation. A sensor in the hydraulic circuit opens a shunt valve to bypass the compactor when the pressure in the hydraulic circuit exceed a pre-programmed pressure value. The '533 application fails to teach measuring the total pressure in multiple hydraulic circuits to determine when pressure should be reduced in only one of the multiple hydraulic circuits.

SUMMARY

According to one aspect of the disclosure, a power management system includes a power generation apparatus configured to deliver mechanical power to a plurality of hydraulic pumps. The apparatus may also include a first hydraulic circuit with a first hydraulic pump powered by the power generation apparatus and a second hydraulic circuit with a second hydraulic pump that is also powered by the power generation apparatus. The power management system may further include a valve coupled to the first hydraulic circuit and the second hydraulic circuit. The valve may be configured to limit a pressure in the second hydraulic circuit as a function of a torque load placed on the power generation apparatus by the first hydraulic pump.

According to another aspect of the disclosure, an apparatus for use in managing power in a mechanical power system may include a first hydraulic circuit having a first pressure and a second hydraulic circuit having a second pressure. The apparatus may also include a pressure sensor that measures the first pressure in the first hydraulic circuit and a pressure relief valve coupled to the second hydraulic circuit that reduces the second pressure based on a combination of the first pressure and the second pressure.

According to yet another aspect of the disclosure, a method of managing power in a mechanical power system may include developing a first pressure in a first hydraulic circuit using a first hydraulic pump driven by a power generation apparatus and developing a second pressure in a second hydraulic circuit using a second hydraulic pump driven by the power generation apparatus. The method may include calculating a torque of the first hydraulic pump based on the first pressure and calculating an allowable pressure in the second hydraulic circuit. The allowable pressure in the second hydraulic circuit may be based on a torque capacity of the power generation apparatus and a current torque of the first hydraulic pump. The method may also include venting the second hydraulic circuit when a pressure in the second hydraulic circuit reaches the allowable pressure.

These and other benefits will become apparent from the specification, the drawings and the claims.

DESCRIPTION

Figure 1:
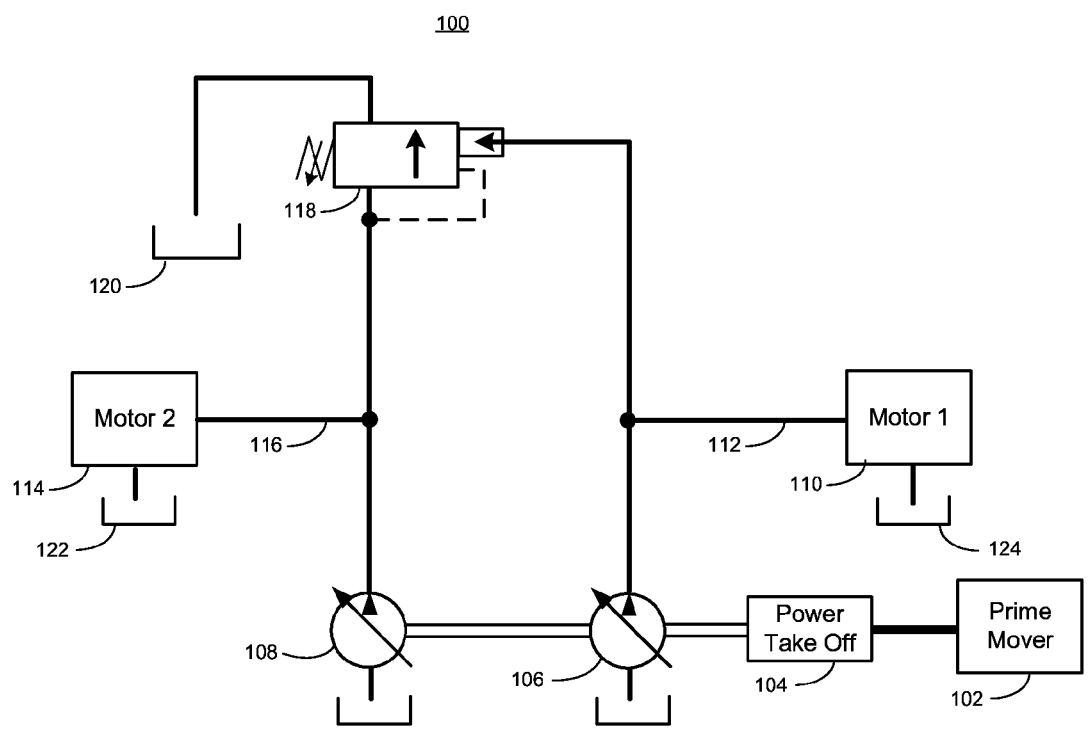
FIG. 1 is a simplified and representative view of a first embodiment of a torque limit control apparatus.

FIG. 1 is a simplified and representative view of a first embodiment of the torque limit control apparatus 100. A prime mover 102, such as a diesel engine, may mechanically drive a power take off (PTO) unit 104. In turn, the PTO 104 may drive a first hydraulic pump 106 and a second hydraulic pump 108. The first hydraulic pump 106 may drive a first hydraulic motor 110 via a first hydraulic circuit 112. The first hydraulic circuit 112 may be completed at tank 124, which may be coupled in a known manner to the hydraulic pump 106. In an embodiment, the first motor 110 may drive a steering unit in a vehicle.

The second hydraulic pump 108 may drive a second hydraulic motor 114 via a second hydraulic circuit 116 and tank 122. In many exemplary embodiments, the tank 122 and the tank 124 may be common with the tank associated with the pumps 106 and 108. The second hydraulic motor 114, in an exemplary embodiment, may be drive a compactor used to compress asphalt for pavement. Other applications using two or more hydraulic pumps and corresponding motors are equally applicable.

A hydro-mechanical pressure relief valve 118 may be connected to vent hydraulic fluid from the second hydraulic circuit 116 to a tank 120 or another low pressure element, such as a cooling fan (not depicted). As discussed above, in many embodiments, there is only one common tank for the entire machine. The pressure relief valve 118 can be set to open when a pressure in the second hydraulic circuit 116 reaches a set-point pressure. The set-point pressure may be a function of the pressure in the first hydraulic circuit 112, such that a higher pressure in the first hydraulic circuit 112 lowers the set-point pressure at which the pressure relief valve 118 opens.

A proportional relationship may be configured at the pressure relief valve 118 so that hydraulic pressures representing the torque at the hydraulic pumps 106 and 108 do not exceed the rated torque at the PTO 104. That is, as the pressure in the first hydraulic circuit 112 increases, the pressure in the second hydraulic circuit 116 required to open the pressure relief valve 118 may be lowered. Therefore, the sum of the torques of the first and second pumps 106, 108 will not exceed the torque maximum of the PTO 104. In doing so, both the PTO 104 and the prime mover 102 are protected from damage to their respective gear trains or other internal components.

The load of the one of the motors 110, 114 may not have as high a priority as the other. In the exemplary embodiment of the road compactor, the first motor 110 may drive the vehicle steering assembly (not depicted) and the second motor 114 may drive a vibratory assembly (not depicted) that does the compacting. Because reducing or eliminating power to the steering assembly could cause a safety issue, it is desirable that only power to the second motor 114 be adjusted to avoid over-torquing the PTO 104. Therefore, the pressure in the first hydraulic circuit 112 is allowed to range up and down and the pressure in the second hydraulic circuit 116 is controlled to ensure that the output of the two pumps 106 and 108 does not exceed the torque rating at the PTO 104.

Figure 2:
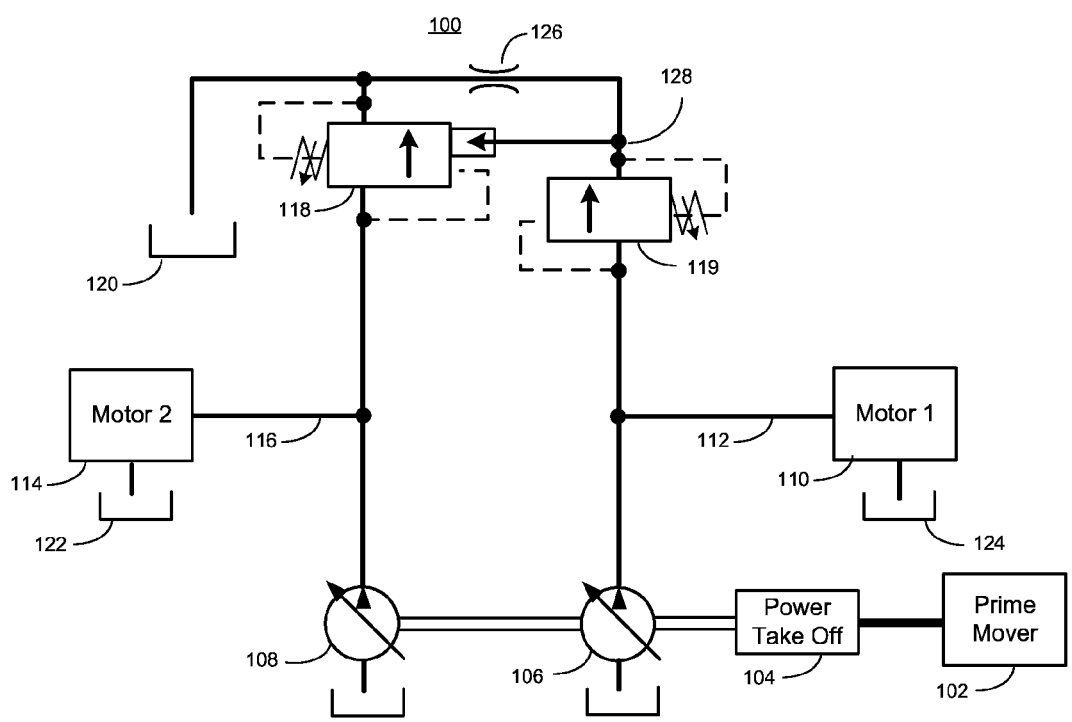
FIG. 2 is a simplified and representative view of another embodiment of the torque limit control apparatus of FIG. 1.

FIG. 2 illustrates a variation on the embodiment of FIG. 1. An intermediate valve 119 is illustrated inserted between the first hydraulic circuit 112 and the pressure relief valve 118. In this embodiment, pressure in the first hydraulic circuit 112 must reach an initial threshold value to open the intermediate valve 119 before the pressure in the first hydraulic circuit 112 will influence the set point of the pressure relief valve 118. When the pressure in circuit 112 reaches an initial threshold value, intermediate valve 119 opens. Flow from intermediate valve 119 through orifice 126 creates a pressure at line 128 that acts on pressure relief valve 118 to reduce or lower the pressure at which 118 opens and begins to relieve or unload circuit 116.

Figure 3:
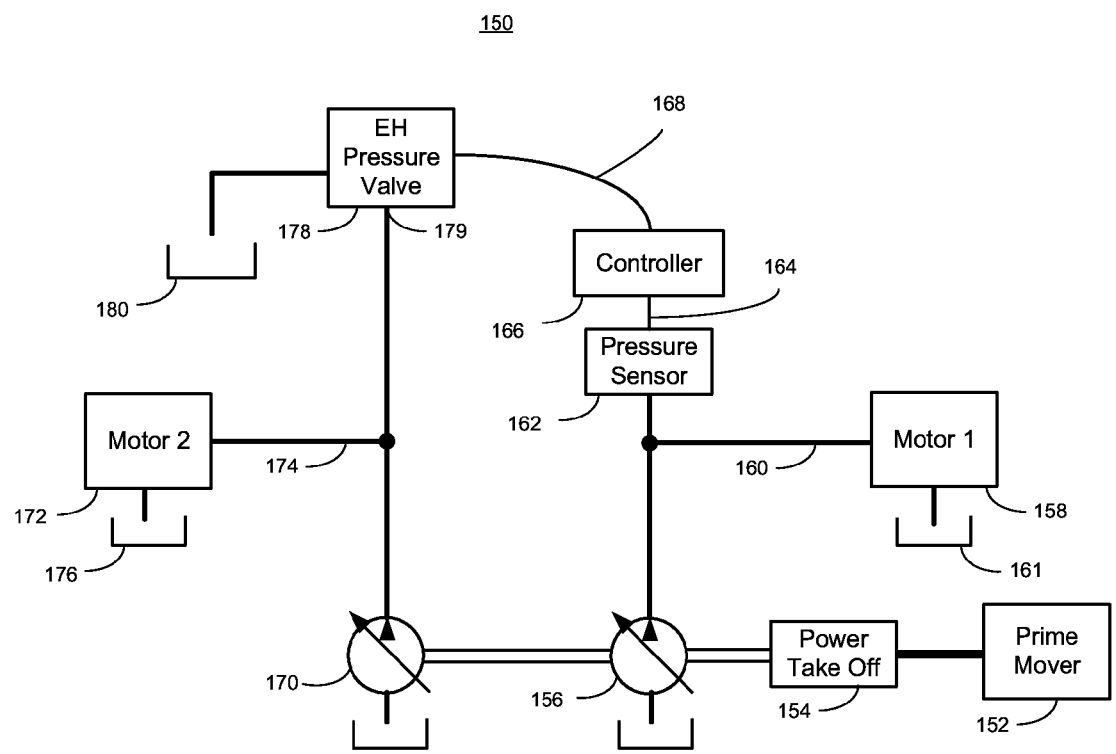
FIG. 3 is a simplified and representative view of another embodiment of a torque limit control apparatus.

FIG. 3 is a simplified and representative view of another embodiment of a torque limit control apparatus 150. As above, a prime mover 152, such as a gas or diesel engine may mechanically drive a power takeoff (PTO) unit 154. The PTO 154 may drive a first hydraulic pump 156. The first hydraulic pump 156 may drive a first motor 158 via a first hydraulic circuit 160. In an embodiment, the first motor 158 may drive a steering assembly for a vehicle, but other applications using a hydraulic motor would be equally supported. As in many hydraulic circuits, the first hydraulic circuit 160 and first hydraulic motor 158 may discharge hydraulic fluid into a tank 161 that returns the fluid to the first hydraulic pump 156.

A second hydraulic pump 170 may also be driven by the prime mover 152 and PTO 154. The second hydraulic pump 170 may provide hydraulic power to a second motor 172 via a second hydraulic circuit 174. In an embodiment, the second motor 172 may drive a vibrator assembly (not depicted) for use compacting asphalt paving. Other applications for the second hydraulic motor 172 would be equally supported. For example, in an excavator, the first hydraulic motor 158 may drive the stick and bucket, and the second hydraulic motor 172 may swing the cab and/or move its tracks. As discussed above, the second hydraulic circuit 174 and second motor 172 may discharge fluid to a tank 176 that returns fluid to the second hydraulic pump 170. In an embodiment, the tanks 161 and 176 may be the same tank or reservoir or may be separate.

In contrast to the hydro-mechanical valve 118 of FIGS. 1 and 2, the embodiment of FIG. 3 uses a pressure sensor 162 that may measure the pressure in the hydraulic circuit 160 and send a signal via electrical connection 164 to a controller 166. The controller 166 may be a standalone processing unit, discussed below with respect to FIG. 3, or may be part of an existing controller, such as an engine controller or machine controller.

An electro-hydraulic pressure relief valve (EH valve) 178 may allow discharging the second hydraulic circuit 174 to a tank 180 or other low pressure device, such as a cooling fan (not depicted). The EH valve 178 may be any of several commercially available products that use an electrical signal to set a pressure at an input 179 required to open the valve 178. In the exemplary embodiment, the input pressure is the pressure in the second hydraulic circuit 174.

The controller 166 may evaluate the pressure in the first hydraulic circuit 160. Using known characteristics of the first hydraulic pump 156, the pressure in the first hydraulic circuit 160 may be converted to a torque of the first hydraulic pump 156. This process is discussed in more detail below. By subtracting the torque at the first hydraulic pump 156 from a rated torque or a torque capacity of the prime mover 152 and/or PTO 154, an allowable torque of the second hydraulic pump 170 may be calculated. Using a process similar to that of calculating the torque at the first hydraulic pump 156 from the pressure in the first hydraulic circuit 160, an allowable pressure may be calculated for the second hydraulic circuit 174 using the allowable torque at the second hydraulic pump 170.

The controller 166 may then generate a signal via electrical connection 168 that determines a set point of the EH valve 178 to open at the allowable pressure. In some embodiments, the signal is a voltage that controls the set point, in other embodiments the signal may be a current. In other embodiments, the signal may be a digital value. A transfer curve or other formula allows the controller 166 to select an appropriate signal value that sets the opening pressure of the EH valve 178 to the calculated allowable pressure of the second hydraulic circuit 174.

Figure 4:
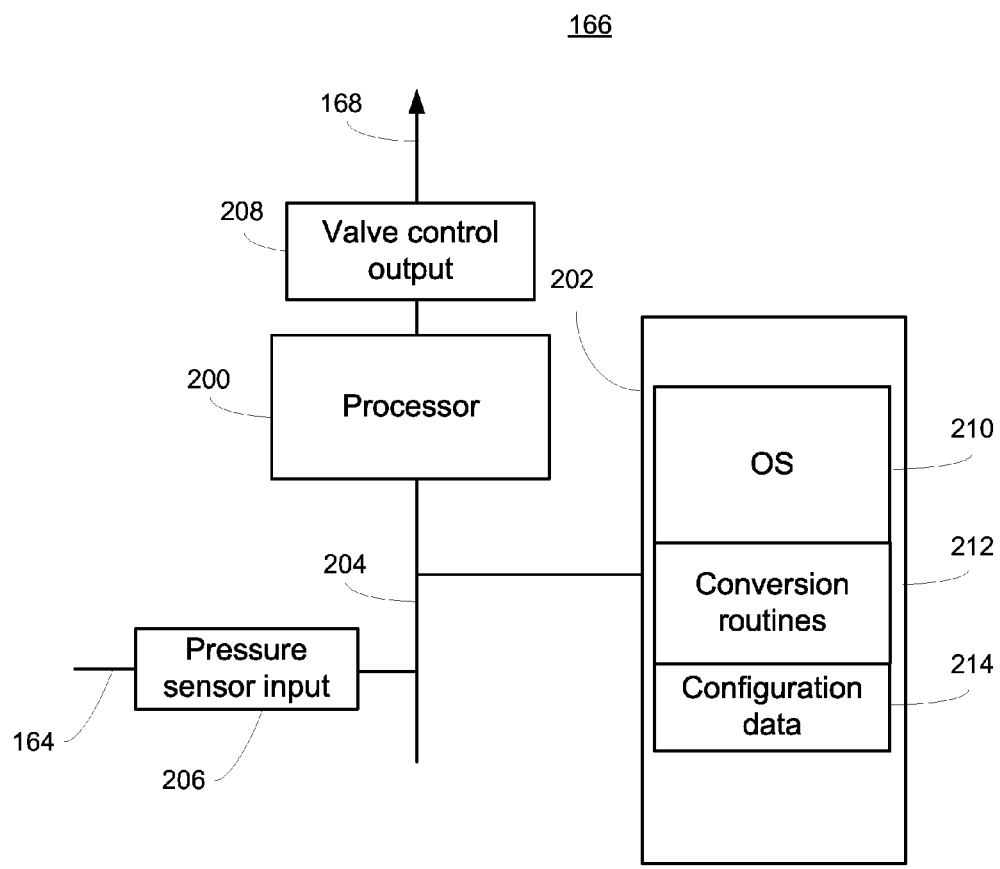
FIG. 4 is a block diagram of a controller suitable for use in the torque limit control apparatus of FIG. 3.

FIG. 4 is a block diagram of an exemplary controller 166 that may be used in an embodiment of a torque limit control apparatus 100. The controller 166 may include a processor 200 and a physical memory 202 including RAM, ROM, EEPROM, flash memory, bubble memory, magnetic media, or other hardware embodiments, but excludes carrier waves and propagated media. The memory 202 may be coupled to the processor 200 by a data bus 204 that may also couple to an input 206 from a pressure sensor 162 via an electrical connection 164. The processor 200 may generate a signal to a valve control output 208. The valve control output 208 may drive the EH valve 178, with the appropriate signal, be it voltage, current, digital, etc.

The memory 202 may include an operating system 210 and may also include conversion routines for performing the math required to calculate torque from pressure and allowable pressure from allowable torque. The memory 202 may also include configuration data including, but not limited to, hydraulic pump displacement values and efficiencies used in the torque/pressure calculations. The configuration data may further include a transfer curve, formula or table that allows the correct output signal for the EH valve 178 based on the allowable pressure of the second hydraulic circuit 174.

INDUSTRIAL APPLICABILITY

Figure 5:
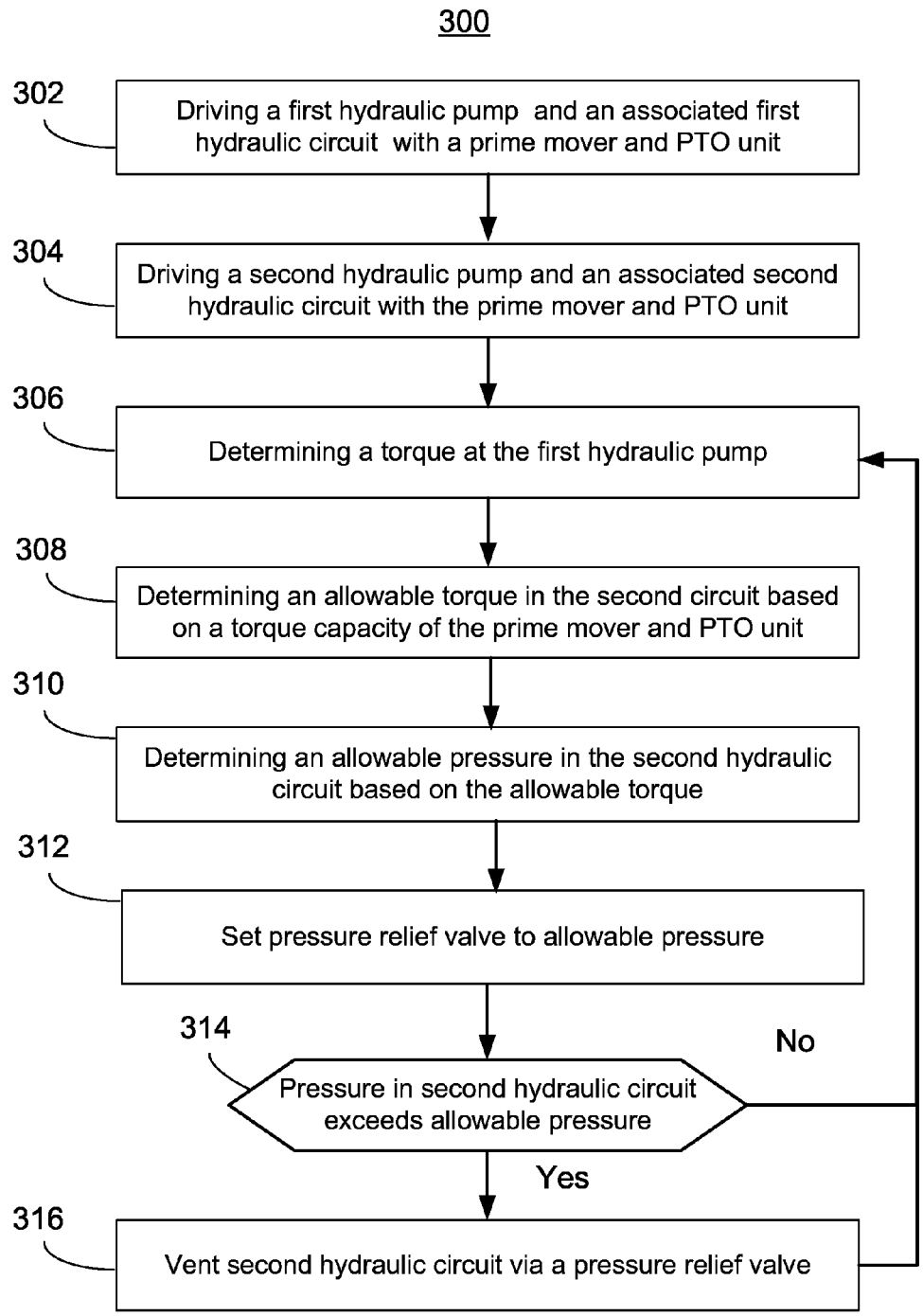
FIG. 5 is a flowchart of a method of using a torque limit control apparatus.

FIG. 5 is a flowchart 300 of a method of using a torque limit control apparatus 150. At a block 302, a first hydraulic pump 156 may pressurize a hydraulic circuit 160 using power supplied by a power generation apparatus, such as a prime mover 152 and power takeoff unit (PTO) 154. At a block 304, a second hydraulic pump 170 may pressurize a second hydraulic circuit 174 using power supplied by the power generation apparatus. In an embodiment, the first hydraulic circuit 160 may drive a motor 158 used to steer a vehicle and the second hydraulic circuit 174 may drive one or more motors 172 coupled to vibratory units used to compact asphalt paving, although other embodiments supporting different applications may be supported. In the exemplary embodiment, the motor 158 may have a higher priority during operation because, for example, one motor's function is associated with safety, while the other motor's function is not time critical.

At a block 306, torque at the first pump 156 may be determined. In general, torque in a hydraulic pump may be calculated as $$\tau = \frac{d\Delta P}{\eta_{TOR}} \qquad \text{Eq. 1}$$

where $\tau$=torque; d=pump displacement; $\Delta P$=outlet pressure−inlet pressure; and $\eta_{TOR}$=mechanical efficiency of the pump. In the exemplary embodiment of FIG. 3, the inlet pressure is atmosphere so $\Delta P$=outlet pressure. For a fixed displacement pump, displacement d is a constant and the efficiency $\eta_{TOR}$ may be assumed to be a constant so that the term $$\frac{d}{\eta_{TOR}}$$

is a constant and the calculation of torque reduces to a fairly simple arithmetic problem.

Therefore, the torque at the first pump 156 may be determined using the pressure in the first hydraulic circuit 160 as measured at a pressure sensor 162 and multiplying by the constant. The pressure in the first hydraulic circuit 160 is a function of activity at the motor 158. In an embodiment where the motor 158 is part of a steering assembly, the motor 158 may demand very little torque from the first pump 156 during straight-line, flat surface operation of a vehicle. However, during turns, maneuvering over uneven terrain, or combinations of those may result in fairly significant demands on the first pump 156 so that it's torque output may increase significantly over its quiescent state.

At a block 308, an allowable torque in the second hydraulic pump 170 may be determined. The allowable torque in the second hydraulic pump 170 may simply be the maximum torque available at the power takeoff 154, or other associated powertrain, minus the torque at the first hydraulic pump 156, or $$\tau_{pump\,2\,max} = \tau_{PTO\,max} - \tau_{pump\,1} \qquad \text{Eq. 2}$$

Calculating the allowable pressure in the second hydraulic circuit 174 is performed using a different form of Eq. 1, so that at a block 310, a maximum allowable pressure in the second hydraulic circuit 174 may be calculated.

$$p_{pump2max} = \frac{(\tau_{pump2max})(\eta_{TORpump2})}{d_{pump2}} \qquad \text{Eq. 3}$$

In an embodiment, an EH valve 178 may be set at a block 312 to the calculated maximum pressure for the second hydraulic circuit by a controller 166 using known transfer curves for the EH valve 178. At a block 314, when the pressure in the second hydraulic circuit 174 reaches the allowable pressure, the EH valve 178 may open. Then, at a block 316, the EH valve 178 may discharge the second hydraulic circuit 174. In an embodiment, the discharge may halt operation of the second motor 172. In other embodiments, particularly when the over pressure situation is an impulse function, the EH valve 178 may close as soon as the pressure drops and the function of the second motor 172 may only be temporarily interrupted so that an operator may not notice the effect.

In an embodiment, the controller 166 may be coupled to a body or implement controller (not depicted) so that events that cause an impulse in the second motor 172 may be monitored. For example, in an embodiment, the most likely time for a torque impulse is when the second motor 172 is turned on and the vibratory assembly starts from a full stop. Because the controller 166 may have information about an operator's activation of the vibratory assembly, the controller 166 may be able to proactively adjust down the set point of the EH valve 178 and thereby limit the maximum pressure in the second hydraulic circuit 174 during the startup period. Because the impulse in the second hydraulic circuit 174 may thus be avoided, a possible torque overload at the PTO 154 and prime mover 152 may also be avoided.

Similarly, the controller 166 may monitor the operator controls (not depicted) to predict a change or spike in pressure in the first hydraulic circuit 160 so that the set point of the EH valve 178 may be adjusted down proactively to more readily vent the second hydraulic circuit 174 and thereby avoid a torque overload due to the impending change of pressure in the first hydraulic circuit 160 and corresponding increase in torque at the first hydraulic pump 156.

Because the embodiment of FIG. 3 uses a controller 166 to monitor and analyze conditions in the hydraulic circuits of a machine, the torque limiting function can be applied to more than the two hydraulic circuits illustrated. By setting a priority of operation and by monitoring pressures and pending actions, additional EH valves in those additional circuits can be dynamically adjusted to provide their associated functions in a priority combination while preserving the total torque demand on the PTO 154 and prime mover 152.

While the above method is described in view of the embodiment of FIG. 3, an equivalent process can be applied to the hydro-mechanical valve embodiment of FIGS. 1 and 2. The torque conversions are inherent in the calibration of the relief pressure settings of the pressure relief valve 118.

The various apparatus and method discussed above benefit both manufacturers and operators of large hydraulically-driven equipment. Manufacturers increase equipment reliability and reduce maintenance costs when the equipment operates within the limits of the various components, even under impulse loads. Operators simply benefit when their equipment performs reliably and does not need to be taken out of service for repairs or other maintenance.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A method of managing power in a mechanical power system, the method comprising:

developing a first pressure in a first hydraulic circuit using a first hydraulic pump driven by a power generation apparatus;

developing a second pressure in a second hydraulic circuit using a second hydraulic pump driven by the power generation apparatus;

calculating a torque of the first hydraulic pump based on the first pressure;

calculating an allowable pressure in the second hydraulic circuit based on a torque capacity of the power generation apparatus and the torque of the first hydraulic pump; and venting the second hydraulic circuit when a pressure in the second hydraulic circuit reaches the allowable pressure.

2. The method of claim 1, wherein calculating the allowable pressure comprises:

subtracting the torque of the first hydraulic pump from the torque capacity of the power generation apparatus to yield an allowable torque at the second hydraulic pump; and converting the allowable torque to the allowable pressure based on known characteristics of the second hydraulic pump.

3. The method of claim 1, calculating the torque of the first hydraulic pump comprises:

measuring the first pressure using a pressure sensor coupled to the first hydraulic circuit;

multiplying, at a controller, a known first hydraulic pump displacement volume by the first pressure and dividing a product of the multiplication by a known mechanical efficiency of the first hydraulic pump.

4. The method of claim 3, further comprising:

adjusting a set point of an electro-hydraulic pressure relief valve to the allowable pressure by applying a signal generated at the controller to an input of the electro-hydraulic pressure relief valve wherein the signal causes the electro-hydraulic pressure relief valve to change a pressure at which the electro-hydraulic pressure relief valve opens to vent the second hydraulic circuit.

5. The method of claim 4, further comprising:

monitoring changes in operation of the second hydraulic circuit; and re-adjusting the set point of the electro-hydraulic pressure relief valve when a change in operation of the second hydraulic circuit will result in an impulse increase in the second pressure.

6. The method of claim 4, further comprising:

monitoring changes in operation of the first hydraulic circuit; and re-adjusting the set point of the electro-hydraulic pressure relief valve when a change in operation of the first hydraulic circuit will result in an impulse increase in torque at the first hydraulic pump.

\* \* \* \* \*